United States Patent

[15] 3,652,857

Frevert

[45] Mar. 28, 1972

[54] ARRANGEMENT FOR DETERMINING THE AVERAGE HEIGHT AND THE THREE-DIMENSIONAL PROFILE OF NONWOVEN SURFACES

[72] Inventor: Erich Frevert, Vienna, Austria

[73] Assignee: Osterreichische Studiengesellschaft fur Atomenergie Ges. m.b.H., Vienna, Austria

[22] Filed: Feb. 3, 1969

[21] Appl. No.: 804,732

[30] Foreign Application Priority Data

Feb. 2, 1968 Austria .................................. A 1041/68

[52] U.S. Cl. .............. 250/43.5 FL, 250/43.5 D, 250/71.5 R, 250/83.3 D
[51] Int. Cl. ....................................... G01n 23/10
[58] Field of Search.................. 250/43.5 FL, 43.5 D, 83.3 D, 250/71.5

[56] References Cited

UNITED STATES PATENTS 3,230,363   1/1966   Prellwitz .......................... 250/43.5 FL

OTHER PUBLICATIONS

Miller, B., " Nucleonic Sensor to Gage Spacecraft Fuel," Aviation Week & Space Technology; May 4, 1964; 74, 75, 77 & 79

Primary Examiner—James W. Lawrence
Assistant Examiner—Morton J. Frome
Attorney—McGlew and Toren

[57] ABSTRACT

An arrangement for checking the depth of the charge and for determining the profile of the surface comprises radiation sources and radiation detectors in different planes. he sources are arranged above the uppermost plane of the detectors and the sources of different planes are displaced with respect to each other. Source and detectors are placed at the corners of an octagon. The chronological control is effected by a comparison arrangement compensating the decay of the activity of the radiation sources.

10 Claims, 9 Drawing Figures

PATENTED MAR 28 1972 3,652,857
SHEET 4 OF 6
FIG.5
FIG.6
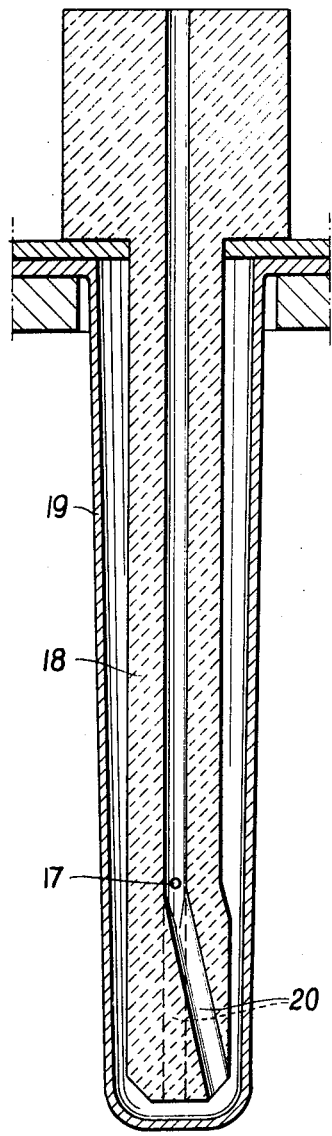
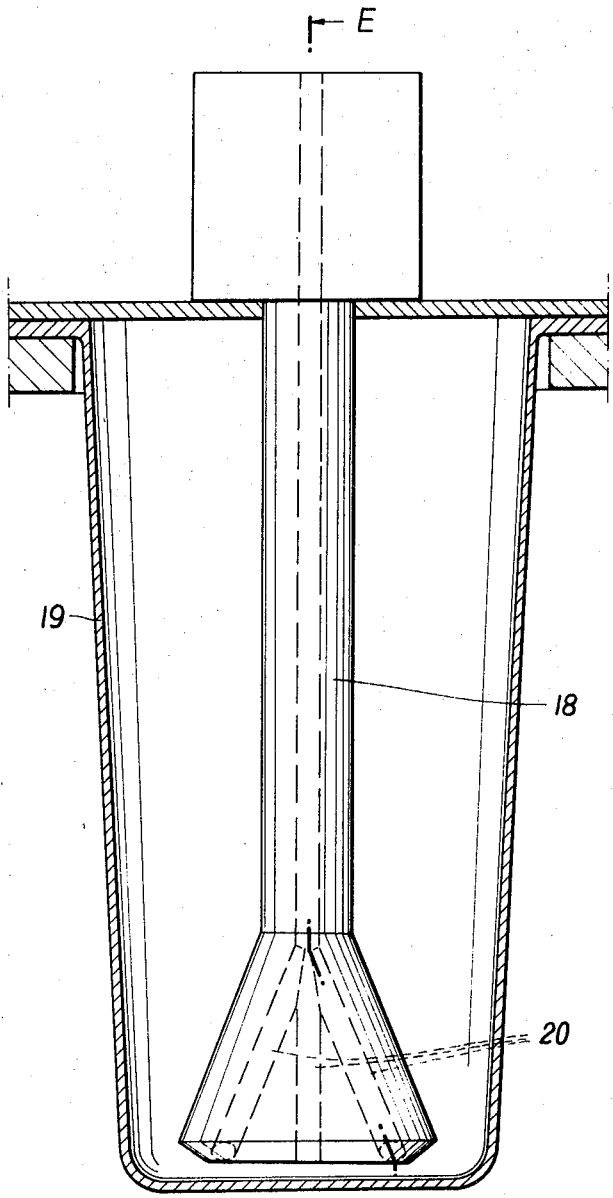
INVENTOR
ERICH FREVERT
By McGlew & Toren
ATTORNEYS

ARRANGEMENT FOR DETERMINING THE AVERAGE HEIGHT AND THE THREE-DIMENSIONAL PROFILE OF NONWOVEN SURFACES

The invention relates to an arrangement for determining the average height and the shape of non-plane surfaces and is characterized in that radio-active radiation sources and radiation detectors are provided in several planes and that the ray-bundles, strongly collimated, are directed downwards in a flat angle whereby the detectors belonging to a given radiation source are arranged in another plane than the radiation source.

In the following the invention is described by way of example and with respect to the drawings.

BRIEF DESCRIPTION OF THE DRAWINGS

FIG. 5 shows the arrangement of a radiation source in a section along line E-F of FIG. 6;
FIG. 6 illustrates a side view to FIG. 5.

DESCRIPTION OF THE PREFERRED EMBODIMENT

Particularly with blast furnaces the checking of the charge depth and the dispersion of the materials over the surface are of high interest. For ensuring a uniform operation of the blast furnace it is necessary to maintain exactly the mean depth of the charge and to have a profile as plane and uniform as possible. It is therefore necessary to have knowledge how the profile is formed before newly charging the furnace.

However, the invention can, of course, be used with storage containers, mixers etc. as well.

Figure 1:
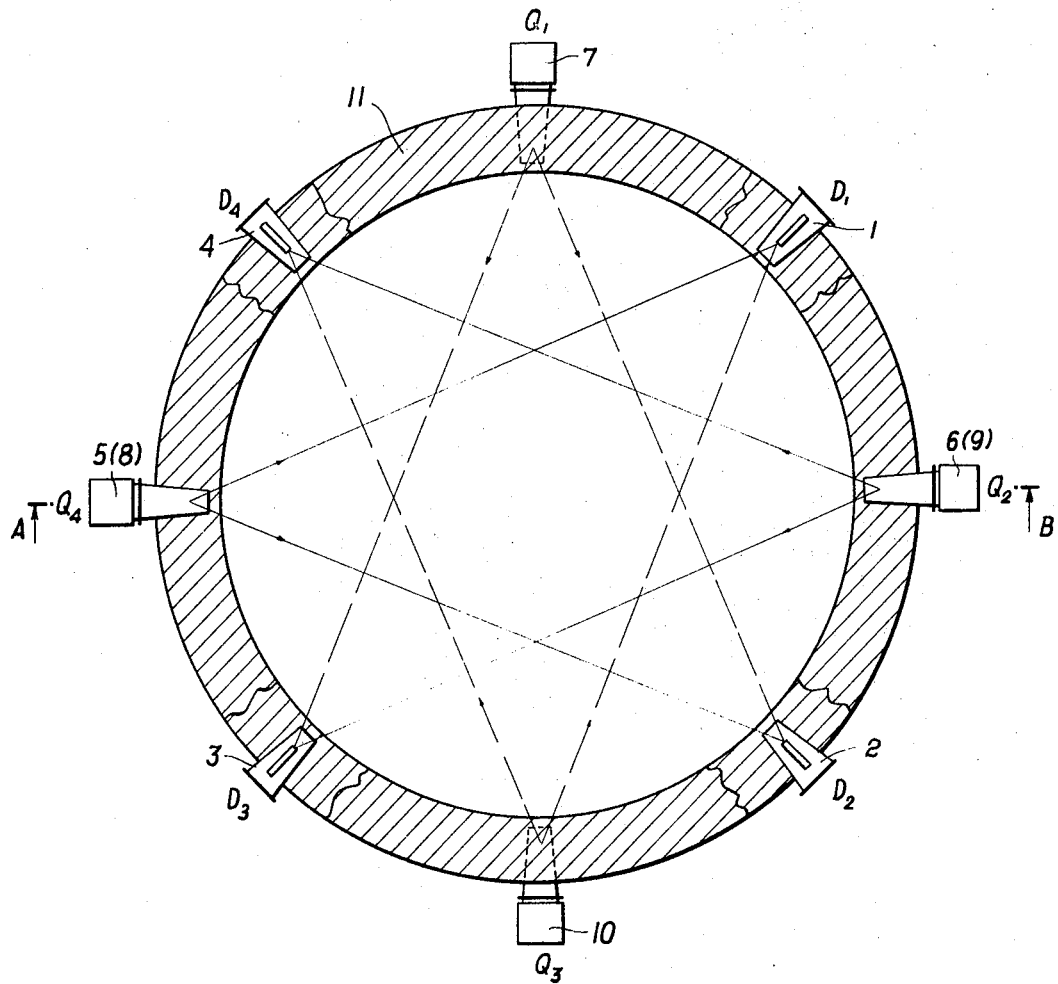
FIG. 1 is a section of a container comprising the inventive arrangement.
Figure 2:
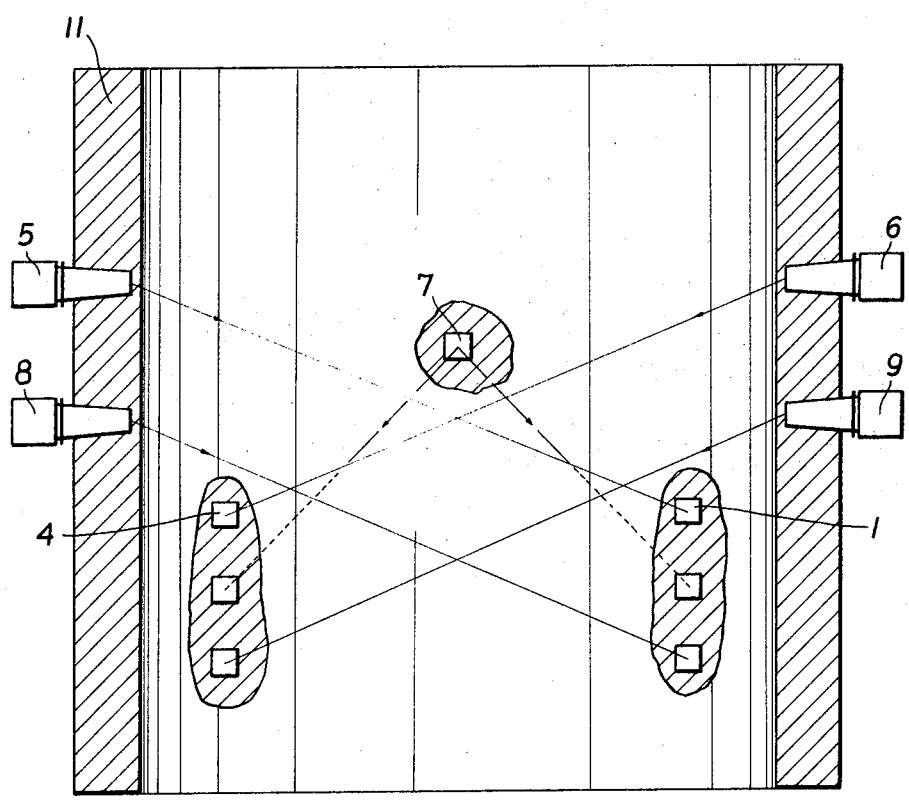
FIG. 2 is a section along line A-B of FIG. 1.
Figures 3, 4:
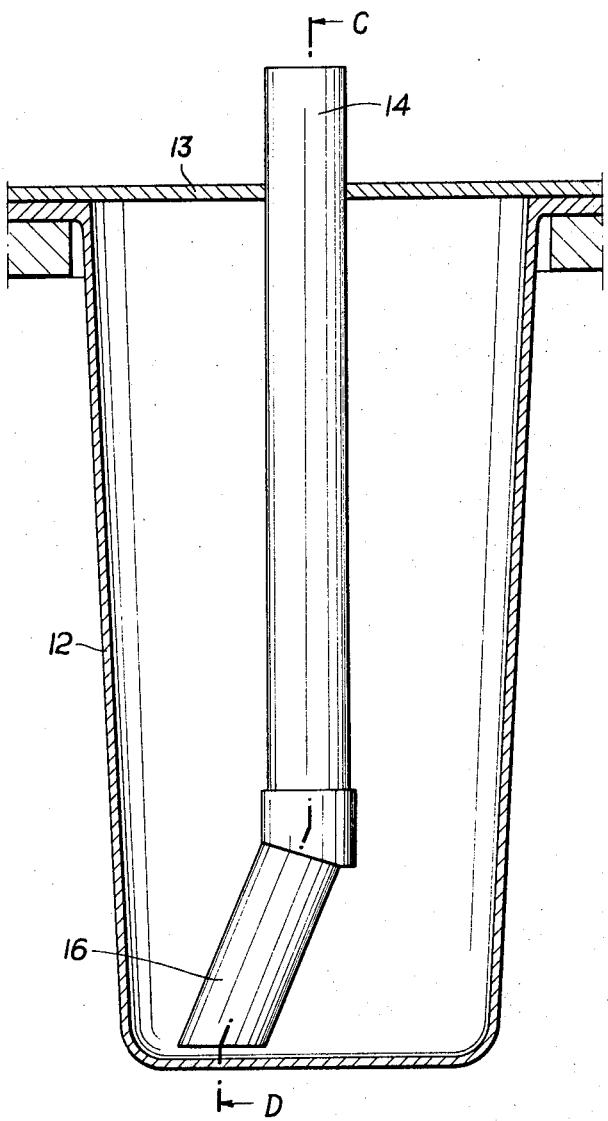
FIG. 3 illustrates the arrangement of a radiation detector by way of a section along the line C-D of FIG. 4.
FIG. 4 is a side view to FIG. 3.

In the embodiment of FIGS. 1 and 2 three planes having each four radiation detectors 1, 2, 3 and 4 are provided. As shown, there are always two detectors diametrically opposed. The sources 5, 6, 7, 8, 9 and 10 are provided above the highest detector plane whereby two sources are opposed in one plane. The sources of the next plane are displaced by 90°. The sources 5, 6 of the uppermost plane cooperate with the detectors 1 to 4 of the uppermost detector plane. The detectors 1 and 2 receive the ray bundles of the source 5 and the detectors 3 and 4 the ray bundles of the source 6. The detectors as well as the sources are arranged in the wall of a container 11 and are accessible from the outside. The charge of the container 11 is penetrated by rays being inclined, for instance 12° to 15°. By this fact the profile can be determined as it is possible to determine the location of a heap. As one can easely learn from the drawings the sources and detectors are arranged at the corners of an octagon. Thus it is possible to make a determination of the shape of the profile. On account of the displacement of the sources by 90° no interference by the sources of the next plane is effected. The sensibility is enlarged as the circular ring of material just penetrated may have twice the width as it has to be penetrated on the side of the detector, only Commercial gamma measurement probes having NaI-scintillation crystals can be used as detectors. For avoiding to have to bore the brick-work of a blast furnace the detectors are arranged in the cooling boxes of the lining. At the same time a protection against exterior mechanical damage and a temperature stress being to high is provided. In FIGS. 3 and 4 the arrangement of the detectors in the cooling boxes is shown. The cooling box is marked with the numeral 12 and, to its cover 13, a tube 14 made of stain-less-steel is attached, in which tube the actual probe 15 is provided. A the lower end of the tube 14 an extension 16 made of lead is provided for decreasing the natural back ground and to remove the scattered radiation. It is possible to adjust the arrangement afterwards so that it has the maximum radiation value.

FIGS. 5 and 6 show the arrangement of the radiation source. On account of the relatively large penetration it is most advantageous to use Cobalt 60. The actual source 17 is within a lead tube 18 provided in a cooling box 19. In the lead tube 18 bores 20 are provided for focusing the rays in the direction of the respective detectors. The intensity of the source has been chosen at 3 Ci whereby it has been observed that, on the one hand, an area as large as possible is penetrated and, on the other hand, the shielding will not become to expensive.

Figure 7:
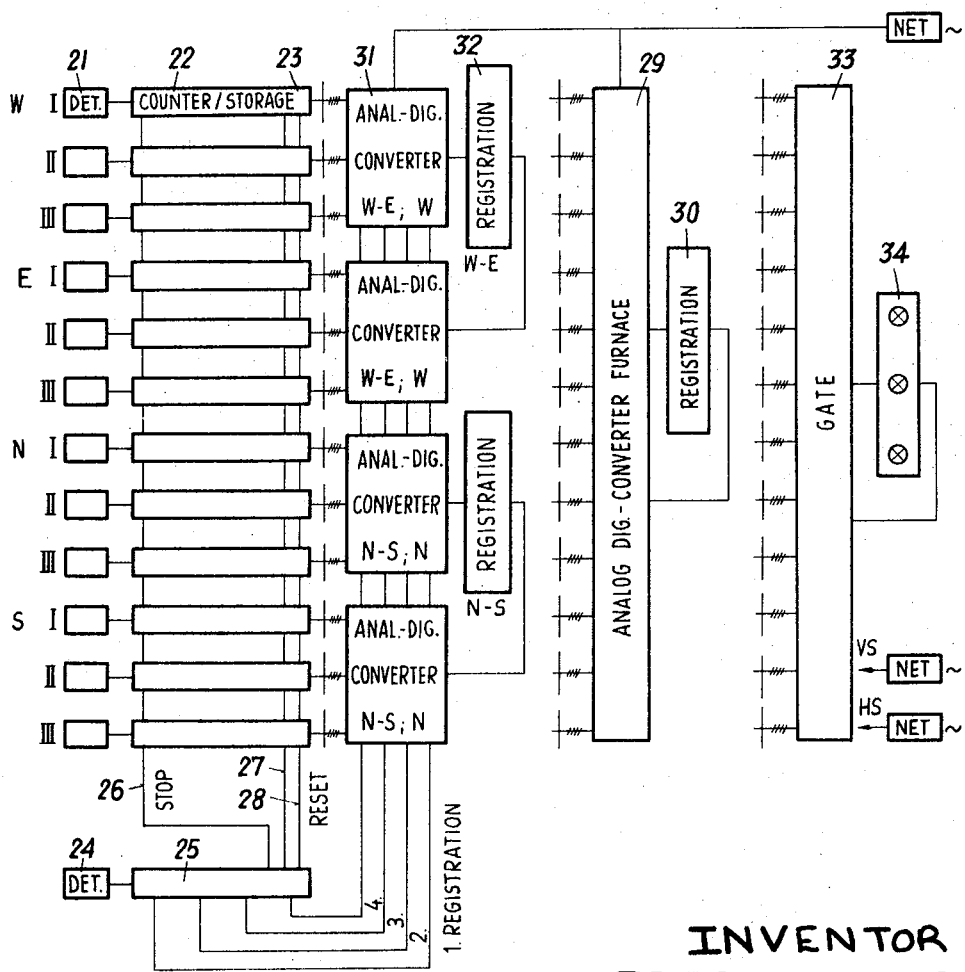
FIG. 7 is a schematic diagram.

In FIG. 7 a diagram of the electronic part of the arrangement is shown. The detectors 21 are arranged in three planes I, II, III. For an easier understanding the detectors lying one above the other are marked with W(est), E(ast), N(orth) and S(outh). Each detector 21 is cooperating with a counter 22 and a storage 23. The counter 22 is constructed by binary elements. Gates arranged in front of the counter 22 allow a separation of the effective signal and of the arising disturbances as well as a regeneration of the effective pulses.

For compensation of the activity decay of the radiation sources due to the decay time, a comparison arrangement comprising a probe 24 and a weak Co-60-source (for instance 1-10 $\mu$ Ci) are provided. The probe 24 cooperates with a counter 25. This counter 25 puts a pulse on a line 26 after a predetermined content of the counter has been reached, by which pulse the other counters 22 are switched off. At the same time the orders for storing and resetting are put on the lines 27 and 28. The contents of the single storages are brought to an analog-digital converter 29 for the complete content which converter is connected to a recording apparatus 30.

For determining the profile the storages of detectors lying one above the other are connected to a separate analog-digital converter 31. The storages 23 of the three superimposed detectors 21 are controlled by the comparison counter 25 in chronological sequence, questioned, converted in the analog-digital converter 31 and recorded by a recorder 32. For the opposed side of the probes the questioning of the respective storage is effected at the same time, but the charge is recorded on the second half of the recorder. Analogously the recording of the second plane displaced by 90° is effected. For a direct display the storages 23 can be connected to a gate 33 cooperating with a light indicator 34.

Figure 8:
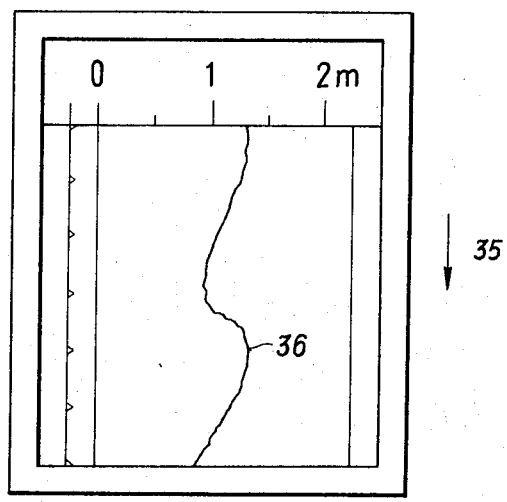
FIG. 8 shows the charge diagram.
Figure 9:
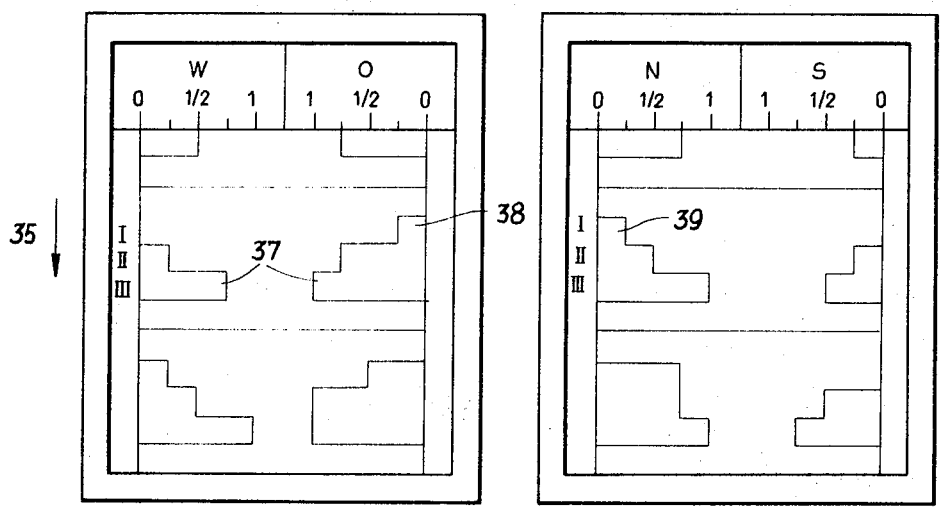
FIG. 9 represents the profile.

In FIGS. 8 and 9 the registration of a strongly asymmetrical charge about the one meter mark is shown. By 35 the direction of movement of the registration paper is marked. The line 36 give the depth of the charge at different times. In FIG. 9 the profile at two different times is represented. Each step of the lines 37 and 38 corresponds to a detector. For simplification it is shown only whether the respective plane is full (1) filled to the half (½) or empty (0). The ray bundle to the detector WI is not hindered, there is no indication. The detectors EI and NI give an indication (step 38 and 39 resp.) of ¼ each. In plane II the steps ¼, ¾, ½ and ¼ and in plane III ¾, full, full and ¼ are found. By these indications one can easily determine the shape of the surface. If desired the scale of the values might have a higher accuracy.

The invention is not restricted to the shown embodiments. Thus the sources may also be provided in a tube immersing into the material to be measured, in which case the detectors are in opposed walls. A source might also cooperate with more than two detectors which in this case are not displaced by 90° to each other but by another angle, for instance by 45° with, three detectors.

I claim:

1. An arrangement for determining the average height and the three-dimensional profile of non-planar surfaces comprising, in combination, a plurality of radiation detectors arranged in plural vertically spaced first planes; and a plurality of radiation sources arranged in a number of vertically spaced second planes equal to the number of first planes, all of said second planes being spaced vertically above the uppermost first plane; the radiation sources in each second plane being spaced angularly relative to the radiation sources in adjacent second planes, and the radiation of the radiation sources in each second plane being directed downwardly at a relatively small angle to the horizontal only to those detectors in a single respective first plane.

2. An arrangement according to claim 1, wherein the radiation sources in each second plane are spaced angularly 90° relative to the radiation source in adjacent second planes.

3. An arrangement according to claim 1, wherein the radiation of radiation sources in vertically successive second planes is directed downwardly at a relatively small angle to the horizontal only to those detectors in respective vertically successive first planes.

4. An arrangement according to claim 1, including two radiation sources in each second plane, each directing radiation to a respective pair of detectors in a single respective first plane.

5. An arrangement according to claim 1, wherein said radiation sources and said detectors are arranged in respective cooling boxes in the lining of a furnace containing a charge whose average height and three-dimensional profile is to be determined.

6. An arrangement according to claim 1, including a respective binary counter connected to each detector; a respective storage connected to each counter; and at least one analog-digital converter connected to said storage.

7. An arrangement according to claim 6, in which each group of storages measuring the depth of a charge having such non-planar surface is connected to a respective single analog-digital converter.

8. An arrangement according to claim 6, in which each detector in a first plane is positioned diametrically opposite another detector in the respective first plane; correspondingly positioned superposed detectors being connected to a single respective analog-digital converter; the analog-digital converters of diametrically opposed detectors being connected to a single respective registration means.

9. An arrangement according to claim 6, further including a comparison arrangement incorporating a counter; said last-named counter controlling the measuring time of said binary counters connected to said detectors.

10. An arrangement according to claim 9, in which said last-named counter supplies, to said binary counters, orders for resetting and for storing.

* * * * *